US009066125B2

(12) United States Patent
Sands et al.

(10) Patent No.: US 9,066,125 B2
(45) Date of Patent: Jun. 23, 2015

(54) SECURE DISPLAY

(75) Inventors: Christopher A. Sands, Herndon, VA (US); Arthur W. Joyce, III, Vienna, VA (US)

(73) Assignee: Advanced Biometric Controls, LLC, Reston, VA (US)

( * ) Notice: Subject to any disclaimer, the term of this patent is extended or adjusted under 35 U.S.C. 154(b) by 512 days.

(21) Appl. No.: 13/371,175

(22) Filed: Feb. 10, 2012

(65) Prior Publication Data

US 2013/0208103 A1    Aug. 15, 2013

(51) Int. Cl.
| | |
|---|---|
| G06F 21/31 | (2013.01) |
| H04N 21/422 | (2011.01) |
| G06F 21/40 | (2013.01) |
| G06F 21/84 | (2013.01) |
| H04N 21/4223 | (2011.01) |
| H04N 21/4363 | (2011.01) |
| H04N 21/4415 | (2011.01) |
| H04N 21/442 | (2011.01) |

(52) U.S. Cl.
CPC .......... *H04N 21/42201* (2013.01); *G06F 21/31* (2013.01); *G06F 21/40* (2013.01); *G06F 21/84* (2013.01); *G06F 2221/2113* (2013.01); *G06F 2221/2137* (2013.01); *G06F 2221/2139* (2013.01); *H04N 21/4223* (2013.01); *H04N 21/43635* (2013.01); *H04N 21/4415* (2013.01); *H04N 21/44218* (2013.01)

(58) Field of Classification Search
CPC .......... G06F 21/31; G06F 21/36; G06F 21/30
USPC ......................................................... 348/78
See application file for complete search history.

(56) References Cited

U.S. PATENT DOCUMENTS

| | | | |
|---|---|---|---|
| 5,420,936 A | 5/1995 | Fitzpatrick et al. | 382/124 |
| 5,493,692 A * | 2/1996 | Theimer et al. | 455/26.1 |
| 5,608,387 A | 3/1997 | Davies | 340/825.34 |
| 6,282,655 B1 | 8/2001 | Given | 713/200 |
| 6,401,209 B1 | 6/2002 | Klein | 713/200 |
| 6,487,662 B1 | 11/2002 | Kharon et al. | 713/186 |
| 6,612,928 B1 | 9/2003 | Bradford et al. | 463/29 |
| 7,229,013 B2 | 6/2007 | Ben-Aissa | 235/380 |
| 7,322,048 B2 | 1/2008 | Nortung | 726/34 |
| 2004/0246272 A1 * | 12/2004 | Ramian | 345/660 |
| 2005/0046584 A1 * | 3/2005 | Breed | 340/825.72 |
| 2007/0026371 A1 * | 2/2007 | Wood | 434/317 |
| 2009/0210934 A1 * | 8/2009 | Innes | 726/7 |
| 2010/0266162 A1 * | 10/2010 | Singh et al. | 382/103 |
| 2011/0072493 A1 * | 3/2011 | Morishita et al. | 726/3 |

\* cited by examiner

*Primary Examiner* — Dave Czekaj
*Assistant Examiner* — Berteau Joisil
(74) *Attorney, Agent, or Firm* — Pillsbury Winthrop Shaw Pittman LLP (57) ABSTRACT

An electronic display is provided for facilitating authentication. The display may integrate one or more of a camera, microphone, fingerprint sensor, card reader, touch screen, and communication interface to collect biometric and other identification information to authenticate a user requesting access to the display. An integrated proximity or motion sensor may be used to track presence of the user. The user may be required to re-authenticate his identity after an absence from the display. The display may be a standalone device or may cooperate with an external computing device. The display may be configured to verify its identity to the external computing device. The display may be configured to perform its own authentication and authorization procedures before presenting content from an external device.

20 Claims, 4 Drawing Sheets

SECURE DISPLAY

FIELD OF THE INVENTION

The invention relates to an electronic display for selectively presenting content, and more specifically to an electronic display that includes integrated devices for facilitating authentication, for detecting a user's presence, or for verifying the display's identity to another device.

BACKGROUND OF THE INVENTION

Controlling access of electronic information and other electronic resources among members of a company or any other organization is known. Access may have been assigned to certain members, who then had to verify their identities. For example, access to certain files or applications may have been assigned to certain users, such as systems administrators. A user attempting to access the files or applications may have to first verify that he or she is authorized, for example, as a systems administrator. The user may verify his or her role through a combination of a user name and password. The user name and password may be received by a computer, and verifying the user name and password may be performed by the computer. If the computer determines that the user name and password is verified, it may output information to a display so that the display can present the information.

SUMMARY

One aspect of the invention relates to an electronic display, such as a monitor, that is configured for secure presentation of information to a user. The information may include, for example, picture content, video content, or audio content. Because the display may contain the medium on which content is ultimately displayed, it is well positioned to be an arbiter of access to the content. The display may control access by requiring a user to verify his or her identity before viewing or listening to content on the display. The display may require the identity verification in response to an output of a presence detection system. The presence detection system may determine when a user is not present at the display. When an authenticated user leaves the display, the display may blank its screen or otherwise remove content from the screen and any other output media. Blanking the screen when the authenticated user leaves may prevent a second user from having access to the unattended display, which the authenticated user may have forgotten to lock or log off. To access the display, the returning user or the second user may need to verify his or her identity. The presence detection system may include, for example, a motion detection sensor (e.g., microwave sensor), a proximity detection sensor (e.g., infrared sensor), or a camera configured to perform facial recognition and to indicate if it does not find a face in its field of view.

In some implementations, the display may be a standalone device that generates or stores content presented on the display. In some implementations, the display may communicate with an external computing device, which may communicate, for example, picture, video, or audio content to the display. In such implementations, the presence detection system may communicate a user's absence to the external computing device. The external computing device may use this information to invoke its own security procedure(s), such as locking or logging out of a user's session. In some implementations, the presence detection system may be able to detect multiple users present at the display. For example, a camera may detect multiple faces in its field of view. The display may be configured to prevent eavesdropping by blanking its screen when multiple users are detected.

The display may include a presence sensor configured to detect whether a user is absent from the display. The presence sensor may comprise a proximity sensor, motion sensor, or a combination thereof to detect the user's absence. For example, presence sensor may comprise an infrared sensor, RFID sensor, microwave sensor, acoustic sensor, or a combination thereof. The RFID sensor may detect whether an RFID tag, such as one on a user's identification card, is out of the sensor's range. In some implementations, the presence sensor may comprise an array of multiple proximity and/or motion sensors to improve accuracy and reduce false positive detections. A user may be determined to be absent if a majority of the proximity and/or motion sensors detect an absence. In some embodiments, the presence sensor may have an odd number of proximity and/or motion sensors to avoid a tie between conflicting sensor detections.

In some implementations, the monitor may be configured to receive presence information from an external system. For instance, the monitor might receive a signal from the building's security system indicating the user leaving the building or entering another building. Such a signal might indicate that the user is no longer present in front of the display, and the display might be configured to react to such a signal by blanking the screen, locking or logging out of the user's session, by requiring the user, when he or she returns, to perform a fresh authentication, or any combination thereof. In some implementations, if the display receives content from an external device, it may transmit a signal to cause the external device to lock or log out of the user's session. In some implementations, blanking the screen (or otherwise removing content from view) may include removing a login screen from view until the user returns from an absence, performs an authentication, or any combination thereof. For example, if the user is absent from the display, the display may blank the screen (or, e.g., present a default static screen or screen saver) and cause an external device from which content is received to lock the user's session. After the external device locks the user's session, it may communicate a login screen to the display. The display may receive the login screen, but may choose not to present the login screen until the user has performed authentication (e.g., biometric authentication) at the display. If the display's authentication is successful, the display may then present the external device's login screen, which may prompt the user for, e.g., a claimed identity and a password.

In some implementations, if a user's session is, locked or logged off in response to an absence, information received for an authentication may be used to log in the user. In one example, the display may blank its screen and collect biometric information from a returning user. If the user's session is locked or logged off by a device supplying the content (e.g., the external device or the display), the biometric authentication may be sufficient to log in the user, and a login screen may be unnecessary, and thus may be not presented. In one example, the display may collect biometric information and then present a screen that prompts input of a password. The collected password information may be used to log in the user, and a separate login screen may be unnecessary, and thus may be not presented.

In some implementations, the display may be configured to receive from the external computing device an access level associated with a user or with content accessed by the user. The display may be configured to require a higher degree of authentication based on a higher access level. A higher degree of authentication may require, for example, a greater amount of biometric information from more biometric sensors, or may require multiple modes of authentication, such as with biometric information as well as information from a cryptographic token or smart card.

In some implementations, any screen for authentication may be generated by the display. All content from the external computing device, including information for rendering a login screen, may be presented only after a user has been authenticated to the display. In some implementations, the display and external computing device may have a cooperative relationship in which the two devices jointly determine login criteria. For example, biometric or alphanumeric information collected by the display may be used to log a user into an authenticated session. In some cases, the external computing device may, for example, accept the display's authentication of a user as sufficient to log in the user. In some cases, the external computing device may additionally require a password or other means of authentication.

In some implementations, the display may be configured to verify its identity to the external computing device. For example, the external computing device may communicate to only a display that performs biometric authentication or that practices other security measures. Such a requirement could be circumvented if a secure display is used to obtain content from the external computing device and an unsecure display is then swapped in after the external computing device has granted access to the content. With a display that is configured to verify its identity, the display may periodically verify its identity to the external computing device. If the external computing device detects a change in an identity of a display to which it is transmitting content, the external computing device may stop transmitting the content.

In some implementations, a communication interface between the display and the external computing is a video interface or any other dedicated communication interface for video data. The video interface may be configured to receive a connector such as a RF connector (e.g., BNC connector), D-subminiature connector (e.g., VGA connector), DVI connector, DIN connector, RCA connector, DisplayPort connector (e.g., MiniDisplayPort connector), HDMI connector, PDMI connector, SCART connector, or any combination thereof. In some implementations, the video interface may include a two-way communication channel, such as a VGA interface, DVI interface, HDMI interface, or any other Display Data Channel (DDC) interface. In some implementations, the external computing device may monitor the electrical load on its video interface to detect disconnections. In some implementations, the display may monitor the electrical load or input on its video interface to detect whether a connector or any other device has been disconnected from the video interface.

In some implementations, the display by itself or in combination with the external computing device may determine whether a user is authorized to view certain content. In some instances, an authenticated user may automatically be authorized to access content. In some instances, an authenticated user may be authorized to access only certain content based on his or her clearance level, based on a time of access, or based on whether other team members or supervisors are present. Similarly, access rights might be based on the state of an external system. For instance, ordinary users may not be allowed to access information if the fire alarm system or other alarm system has been activated, but users who are members of the crisis management team may be given greater access rights when the alarm sounds.

In some implementations, the display may include integrated sensors configured to take biometric measurements of a user. The integration of the sensors with the electronic display may enhance one or more of reliability, ease of use, security, cost of manufacture, and/or other aspects of the operation of the sensors with respect to free-standing biometric sensors.

In some implementations, sensors integrated with the electronic display may be configured to facilitate authentication based on one or more of a user's facial image, iris image, retina image, voice, fingerprint, hand geometry, any other biometric information, or a combination thereof. The display may be configured to facilitate authentication based on other identification information, such as password, card or badge information, handwriting information, or a combination thereof. The sensors may include one or more of a camera, a microphone, a fingerprint sensor, a touch screen, a card reader, a presence sensor, and/or other sensors.

A camera may be configured to capture facial image information from a user. The camera may have a resolution and sensitivity specialized for capturing facial images, or may be configured to also capture iris image information or retina image information.

In some implementations, the electronic display may include a camera configured to capture the user's iris and/or retina image information. The camera may have a resolution and sensitivity specialized for capturing eye images. For example, the camera may be sensitive to infrared radiation that is reflected off of a user's eye. The infrared radiation may be emitted by an infrared illumination source included in the electronic display. In some implementations, the facial image camera and iris/retinal image camera may be general purpose cameras sensitive to visible light. In some implementations, a single camera may be used to capture a facial image and an iris/retinal image.

In some implementations, the electronic display may include a microphone that may be configured to capture voice information from a user. The precision of the microphone may be sufficient to perform voice print and/or voice recognition based on the captured voice information.

In some implementations, the electronic display may include one or more fingerprint sensors that may include a capacitive, optical, ultrasonic, or any other sensor configured to capture a pattern from ridges and valleys of a user's fingerprint. In some implementations, a fingerprint sensor of the display may be shaped and sized to receive a user's finger. For example, the fingerprint sensor may have a concave shape that recesses into the display housing to form a larger contact area with the user's finger. In implementations in which the display includes multiple fingerprint sensors, such sensors may be sized differently to correspond to different fingers of a user's hand. For example, a bigger fingerprint sensor may be configured to receive a user's thumb, while a smaller fingerprint sensor may be configured to receive the user's index finger. In some implementations, all fingerprint sensors may be located on one side of the display. In some implementations, an electronic display may have fingerprint sensor(s) on both sides of the display.

In some implementations, the electronic display may include a touch screen system. The touch screen may include a capacitive, resistive, infrared, or any other sensor. The sensor may be configured to capture a user's fingerprint information, such as a pattern from ridges and valleys of a user's fingerprint. The touch screen may be configured to receive other forms of identity information, such as alphanumeric information inputted through the touch screen, handwriting or other movement information captured at the surface of the touch screen, hand geometry information, or any combination thereof.

In some implementations, biometric information may be received through external sensors. For example, the electronic display may include a communication interface that is configured to receive hand geometry information from an external touchpad, facial image information from an external camera, voice information from an external microphone, eye image from an external eye scanner, or any combination thereof.

In some implementations, the electronic display may include a reader that may be configured to collect identification information from a cryptographic token, smart card, identification card, or any other physical instrument of identification. For example, the reader may include a magnetic reading head configured to collect identification information from a magnetic stripe, an RFID sensor configured to collect identification information from an RFID tag, a bar code scanner configured to collect identification information from a barcode, an optical scanner configured to collect identification information from printed images and text, or any combination thereof. The reader may be configured to collect information from other forms of identification documents. For example, the card reader may be configured to scan and collect information from a passport. In some implementations, the communication interface of the electronic display may receive such identification information from an external scanner. In some instances the reader may include a USB port configured to interface to a cryptographic token.

In some implementations, the electronic display may comprise a processor or any other processing device for processing the collected information. The processor may be configured to execute one or more computer program modules or part of one or more computer program modules. The computer program modules may include one or more of an authentication module, an authorization module, a presence monitoring module, an access request module, presence management module, and/or any other modules. The authentication module may include, in some implementations, a biometric processing module.

The authentication module may be configured to verify a user's identity. For example, the module may be configured to process one or more of smart card information, cryptographic token information, and biometric information to determine whether the information sufficiently verifies the user's identity.

The biometric processing module may be configured to extract relevant features from collected biometric information and compare the features against features in a biometrics database, which may be stored in the electronic display or in external storage.

The presence monitoring module may be configured to present a blank screen, a screen saver, or an authentication screen in response to determining that a user has left the display. The screen may be blanked, for example, immediately after the user has left the screen or after a threshold amount of time. The presence monitoring module may be configured to communicate the absence to a login module on the display or on an external computing device, which may lock or log out of a user's session based on the absence.

The access request determination module may be configured to determine whether the electronic display has received a request from a user to gain access to the display. The access request determination module may determine that there is an access request based on detecting a user's presence, receiving a login, authorization, or authentication command, receiving user identification information, or any combination thereof. The access request module may determine a level of access that has been requested, such as by identifying an access level from the access request, from an access level database, from an indication received from an external device, or any combination thereof. The access level database may associate user identification information with an access level, and may specify the amount and types of identification information required for authentication to that access level. The access level database may be stored on the electronic display, or may be stored externally.

The authorization module may be configured to determine whether a user, such as an authenticated user, is authorized to access certain content based on authorization criteria. The authorization criteria may include, for example, whether the user is accessing certain content during approved hours, or whether other team members or supervisors are in the vicinity of the user.

In some implementations, one or more of the authentication module, the authorization module, presence monitoring module, access request determination module, presence management module, and/or any other module may be executed on an external computing platform that processes identification information collected and transmitted by the electronic display. The identification information may be transmitted by the communication interface. The electronic display may then receive the output of the processing from the external computing platform. Because of the integration of the sensors with the electronic display, the communication interface may facilitate communication of biometric measurement information (e.g., captured by the various sensors) with the computing platform via a common communication port (e.g., a single USB port, a single firewire port, and/or other individual communication ports), via a common communication cable, and/or through other communication media in common. The communication channel may be part of the video interface, for instance, the Display Data Channel (DDC) present in VGA, DVI and HDMI interfaces.

One aspect of the invention relates to facilitating multiple degrees of authentication based on a level of access. The access level may be determined by the access request determination module or any other module configured to manage levels of user access on the electronic display. A higher degree of authentication may correspond to a higher level of access to information and applications displayable on the electronic display. In one example, one level of access may correspond to a user without security clearance, while a second level of access may correspond to a user with medium security clearance, and while a third level of access may correspond to a user with a high security clearance. In one example, one level may correspond to a non-administrative user, while a second level may correspond to a systems administrator. In some implementations, a higher degree of authentication may be required for a higher access level. For example, a user logging into a session having a system administrator's access level may be required to verify more biometric and other identification information compared to a user logging into a session having a non-administrative access level. In one example, a user may be permitted to log into different levels of access to view different content. For example, the user may be permitted to log into a public access level to view unclassified content, and later may be permitted to log into a clearance access level to view top secret, content. In this example, the display can require additional authentication even after an initial log-in, so that a user can be authenticated quickly to view non-sensitive information, but would be required to re-authenticate to a stronger standard when the user attempts to access more highly sensitive information.

The display, parts of the display, or external devices attached to the display may practice aspects taught in patent application Ser. No. 13/286,119, the entire content of which is incorporated herein by reference.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
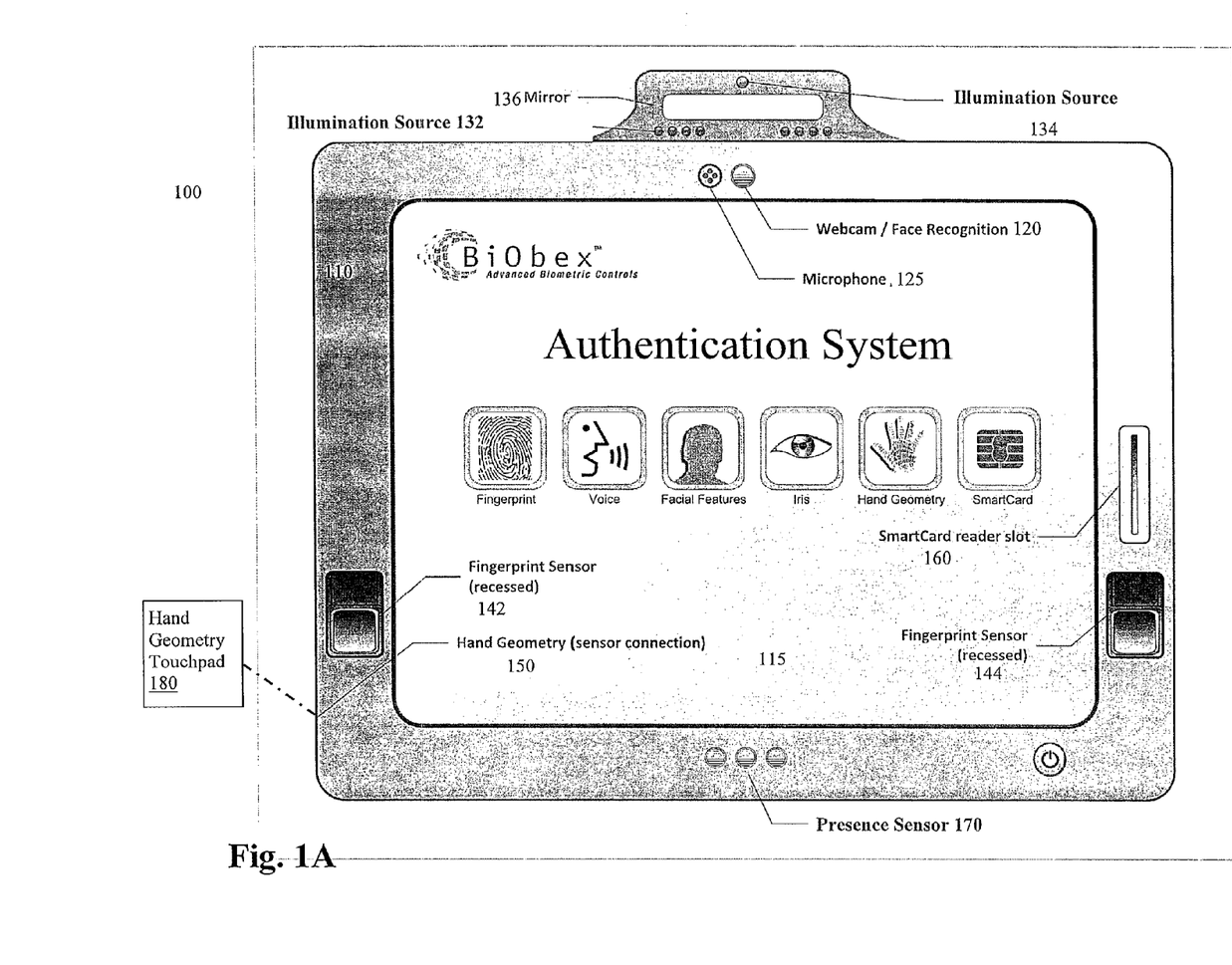
FIG. 1A illustrates an example electronic display that is configured to collect biometric authentication information.

FIG. 1A illustrates an electronic display 100 that includes integrated sensors that are configured to collect biometric information (e.g., information on facial image, iris image, retina image, voice, fingerprint, or geometry information) from a user, which may be used to authenticate the user's identity and to grant access to content presentable on electronic display 100. The electronic display may include integrated sensors configured to collect other identification information (e.g., smart card information, password information, handwriting information) and to authenticate the user's identity based on the other identification information. The integration of sensors with the electronic display may enhance one or more of reliability, ease of use, security, cost of manufacture, and/or other aspects of operation of the sensors with respect to free-standing sensors. The integration of sensors with the electronic display may reduce the size of a biometric authentication system.

In some implementations, electronic display 100 may include a housing 110 that houses a display screen 115, a camera 120, a microphone 125, a card reader 160, and a presence sensor 170. In some implementations, electronic display 100 may include an eye scanner 134, one or more fingerprint sensors 142, 144, or any combination thereof housed in housing 110. In some implementations, electronic display 100 may include one or more processors that process information collected sensors housed in housing 110.

Screen 115 may be configured to display content (e.g., audio, image, or video content) that is generated by the one or more processors of display 100 or that is received by display 100 from an external computing device, such as a computer connected to the display. In some implementations, screen 115 may be a touch screen that is configured to capture fingerprint information, hand geometry information, or a combination thereof. In one example, screen 115 may include one or more capacitive, resistive, infrared, or any other sensors embedded in or under screen 115 and configured to capture a pattern of ridges and valleys of a user's fingerprint. The one or more sensors may be configured to capture hand geometry information from contact of a user's hand with screen 115. In some implementations, screen 115 may be a touch screen configured to capture other forms of user input. For example, screen 115 may be configured to collect handwriting information by capturing movement of a user's finger or stylus at the surface of screen 115. Screen 115 may be configured to capture alphanumeric input, such as selections of keys on a virtual keyboard, of a button, a scroll bar, a checkbox, or any other user interface object displayed on screen 115. The alphanumeric input may include, for example, a password, PIN number or key to access a security token.

Camera 120 may be a webcam, or any other type of image capture device, configured to capture facial image information through a lens in housing 110. Camera 120 may comprise sensors sensitive to visible light, infrared light, or any combination thereof ("Light" used herein refers to any electromagnetic radiation). For example, camera 120 may comprise charge coupled devices (CCD's) sensitive to light entering the lens of housing 110. In some implementations, housing 110 may further house an illumination source configured to, illuminate a user's face. For example, housing 110 may house an LED, strobe light, or any other illumination source. The source may be configured to emit visible light, infrared radiation, or a combination thereof.

Microphone 125 may comprise a transducer configured to capture voice information. In some implementations, the transducer of microphone 125 may be embedded in housing 110 and may collect voice information through one or more audio ports in housing 110. FIG. 1, for example, shows four audio ports through which microphone 125 may capture voice information. The transducer of microphone 125 may include a diaphragm, magnet, fiber optic cable, piezoelectric material, or any other material or component configured to capture voice information. The precision of microphone 125 may be sufficient to perform voice print and/or voice recognition based on the captured voice information.

Card reader 160 may, in some implementations, include a structure forming a slot through which an identification card may be inserted or swiped. For example, card reader 160 may include a sub-housing attached to housing 110. The sub-housing may form a slot, with a magnetic reading head placed on at least one side of the slot. The slot may be open on both ends to allow a magnetic stripe card to be swiped through the slot. In some implementations, card reader 160 may form a slot that extends into housing 110. The slot may be dimensioned to allow an identification card to be inserted into housing 110 through the slot. For example, the size of the slot of card reader 160 may follow the International Organization for Standardization's ISO/IEC 7810 standard, which yields slot sizes of approximately 15 mm, 54 mm, 74 mm, or 88 mm. The slot may have any other dimension for receiving an identification card. In some implementations, card reader 160 may include electrical contact pads configured to interface with a circuit that encodes information on an identification card.

A card reader of the electronic display may, in some implementations, be configured to collect information from an identification card touching or near housing 110. For example, the card reader may include an RFID reader configured to receive identification information from a smart card touching or near housing 110. The RFID reader may include an RF transmitter configured to emit radio frequency energy and an RF receiver configured to receive RF signals from a smart card, badge, or any other identification card. The smart card may be considered to be near housing 110 based on whether it receives sufficient radio frequency energy from the RF transmitter to power circuits within the smart card.

A card reader of the electronic display may, in some implementations, include a bar code scanner configured to collect information from a bar code on an identification card. In some implementations, a card reader may include an image scanner configured to collect image and alphanumeric information from the card. A card reader is not limited to reading identification cards, but may be configured to read other identification documents. For example, a card reader having an image scanner may be configured as a card reader, a passport reader, or a combination thereof.

Presence sensor 170 may comprise a motion sensor, a proximity sensor, a camera (e.g., camera 120), or any combination thereof. For example, presence sensor 170 may include one or more inductive sensors, capacitive sensors, photoelectric sensors, infrared sensors, ultrasonic sensors, microwave sensors, RFID sensors, or any other sensor configured to detect whether a user is absent from housing 110 of display 100. In some implementations, electronic display 100 may execute a facial recognition system to determine whether a face is within a field of view of camera 120. A user's absence may be determined by failure to detect a face within the field of view of the camera. In some implementations, the presence sensor may detect an absence if the presence sensor detects no motion within a certain range of housing 110, if the presence sensor detects no object within a certain range of housing 110, or any combination thereof. For example, an RFID sensor of the presence sensor may detect whether an RFID tag, such as one included on a user's smart card, is out of range, and may thus detect whether a specific user associated with the RFID tag is absent from display 100. The presence sensor may indicate that a user is absent immediately after the user leaves the display, or after the user has left the display for a certain duration.

In some implementations, presence sensor 170 may comprise a plurality of sensors arranged as a sensor array. The plurality of sensors may rely on a plurality of the above sensor technologies to improve detection rate and reduce false positive detections. For example, the sensor array may comprise a microwave sensor that is sensitive to radiation reflected from a moving user and an infrared sensor that is sensitive to infrared radiation emitted from a stationary user. If the sensors of the sensor array produce conflicting indications of whether a user is absent, the sensor array may adopt the indication produced by a majority of the sensors. In some implementations, the total number of sensors in the sensor array may be an odd number to avoid having an equal number of sensors producing conflicting indications. For example, if presence sensor 170 comprises an infrared sensor, a microwave sensor, and a sensor configured to detect one or more faces in its field of view, a common indication from at least two of the three sensors may be adopted as the indication of presence sensor 170. Electronic display 100 may determine that a user is absent from the display based on a signal from presence sensor 170 indicating one or more users to be absent, or based on a lack of signals from presence sensor 170. For example, if presence sensor 170 does not detect motion or proximity of an object within a certain range of housing 110, it may produce a signal indicating the object's absence, or it may simply produce no signal.

In some implementations, electronic display 100 may comprise an eye scanner 134 configured to capture iris image information, retina image information, or a combination thereof. Eye scanner 134 may be housed in housing 110 and may be located above screen 115. Eye scanner 134 may comprise a camera separate from camera 120. In one example, the camera may be configured to capture visible light, including intensity, color, or a combination thereof of light reflected off of the user's eye. In one example, the camera may be configured to capture infrared radiation reflected off of a user's eye. The camera may capture the reflected visible light or infrared radiation through a lens in housing 110. In some implementations, visible light or infrared radiation reflected from a user's eye may come in part from an illumination source 132 housed in housing 115. Illumination source 132 may be located close to eye scanner 134, such as in a position adjacent to the eye scanner. Illumination source 132 may comprise, for example, an LED configured to generate infrared radiation at one or more frequencies, at or about the range of 750 nm to 1000 nm. In another example, illumination source 132 may comprise an LED configured to generate visible light at one or more frequencies. Illumination source 132 may comprise any other source of visible light, infrared radiation, or any other form of light. In some implementations, illumination source 132 and the illumination source for camera 120 may be a single illumination source, while in other implementations they may be separate illumination sources.

In some implementations, electronic display 100 may include a mirror 136 for assisting a user in positioning his or her eye relative to eye scanner 134. Mirror 136 may be housed in housing 110 and located adjacent to eye scanner 134. In some implementations, the mirror may be partially reflective. For instance, a "cold mirror" may allow infrared light to pass through while reflecting visible light. Such a mirror might be positioned directly in front of the camera lens. In this configuration, the camera may be able to see exactly the same image that the user sees in the reflection.

In some implementations, electronic display 100 may comprise one or more fingerprint sensors 142, 144. A first fingerprint sensor may be located on one side and a second sensor may be located on the same side or a different (e.g., opposite) side of screen 115. For example, fingerprint sensor 142 may be located on the right side to facilitate capturing fingerprints from fingers on users' right hands, or fingerprint sensor 144 may be located on the left side of screen 115 to facilitate capturing fingerprints from users' left hands. In some implementations, electronic display 100 may have "five-print" fingerprint sensors, which might be located below screen 115. A five-print sensor may be able to acquire fingerprints from all of the fingers on users' hands simultaneously. In some implementations, electronic display 100 may have a five-print fingerprint sensor on the right side of screen 115, a five-print fingerprint sensor located on the left side of screen 115, or some combination thereof. A plurality of fingerprint sensors may be arranged in an arc corresponding to general relative locations of a hand's fingers, which may allow multiple fingerprints to be captured simultaneously. A fingerprint sensor may form a surface for receiving a user's finger. For example, the surface may comprise a platen between 3 and 7 inches on a side and adapted to simultaneously capture an image of four fingers and a thumb of a user's hand.

One or more of the sensors 142, 144 may, in some implementations, comprise an array of capacitive sensors configured to capture positions of ridges and valleys of a finger touching fingerprint sensor 142. In some implementations, one or more of the fingerprint sensors 142, 144 may comprise an ultrasonic source configured to emit high frequency sound waves and an ultrasonic sensor configured to measure reflections of the emitted sound waves from a user's finger. For example, fingerprint sensor 142 may comprise a piezoelectric transducer configured to both generate ultrasonic waves and to measure reflections of the emitted waves. In some implementations, one or more of fingerprint sensors 142, 144 may comprise one or more optical sensors configured to capture an image of a user's fingerprint. For example, fingerprint sensor 144 may comprise a light-emitting layer and a charge-coupled device (CCD) layer. The light-emitting layer may illuminate a user's finger, and the CCD layer may capture an image of the user's fingerprint.

In some implementations, electronic display 100 may comprise a communication interface 150 for communicating with an external sensor, other electronic displays, an external storage device, a mobile device, a server, any other external computing device, or any other electronic device. For example, communication interface 150 may receive hand geometry information collected from a hand geometry touchpad 180. Communication interface 150 may receive biometric information from other external sensors, such as voice information from an external microphone, iris image information from an external iris scanner, facial image information from an external camera, fingerprint information from an external fingerprint sensor, or any combination thereof. In some implementations communication interface 150 may include one or more of a USB port, a IEEE 1394 (Firewire®) port, an Ethernet port, a serial port, or any other electronic information communication interface. In some implementations, communication interface 150 may include a wireless communication interface, such as Bluetooth®, a IEEE 802.11 interface, or any other wireless communication interface.

The external sensors may practice security measures taught in U.S. patent application Ser. No. 13/286,119, the entire content of which is incorporated herein by reference.

In some implementations, the electronic display 100 may be configured to receive presence information from external systems. For instance, the monitor might receive a signal from the building's entry control or other security system indicating the user leaving the building or entering another building. Such a signal might indicate that the user is no longer present in front of display 100, and display 100 might be configured to react to such an indication by blanking screen 115, locking or logging out of the user's session, by requiring that the user perform a fresh authentication, or any combination thereof.

In some implementations, electronic display 100 may include one or more processors configured to process the collected biometric information and to match the collected information against a database of users' biometric information. In some implementations, electronic display 100 may be configured to transmit the collected biometric information to an external computing platform, such as a server or desktop computer, configured to process the collected information and to match it against a biometrics database. The transmission may be made through communication interface 150, or through another communication interface of electronic display 100. Because of the integration of the sensors with the electronic display, communication interface 150 may facilitate communication of biometric information (e.g., captured by the various sensors) with the computing platform via a common communication port (e.g., a single USB, a single Firewire port, and/or other individual communication ports), via a communication cable and/or other communication media.

In some implementations, biometric authentication may be performed entirely on the display. For example, housing 110 of display 100 may contain the one or more processors for processing biometric information and may contain a data storage device storing the database of users' biometric information. Performing the biometric authentication on the display can enhance standalone capabilities of the display. The display may be part of, for example, a standalone tablet computer able to store content and perform biometric authentication without reliance on an external computing device. Such a standalone display may occupy less physical space and provide more convenience to a user.

In some implementations, electronic display 100 or another electronic display configured to collect authentication information may be used to implement different degrees of authentication. Each different degree of authentication may require a different amount or combination of identification information, and may grant a different level of access to information, applications, and other resources of the display and/or of any computing device attached to display 100.

Figure 1B:
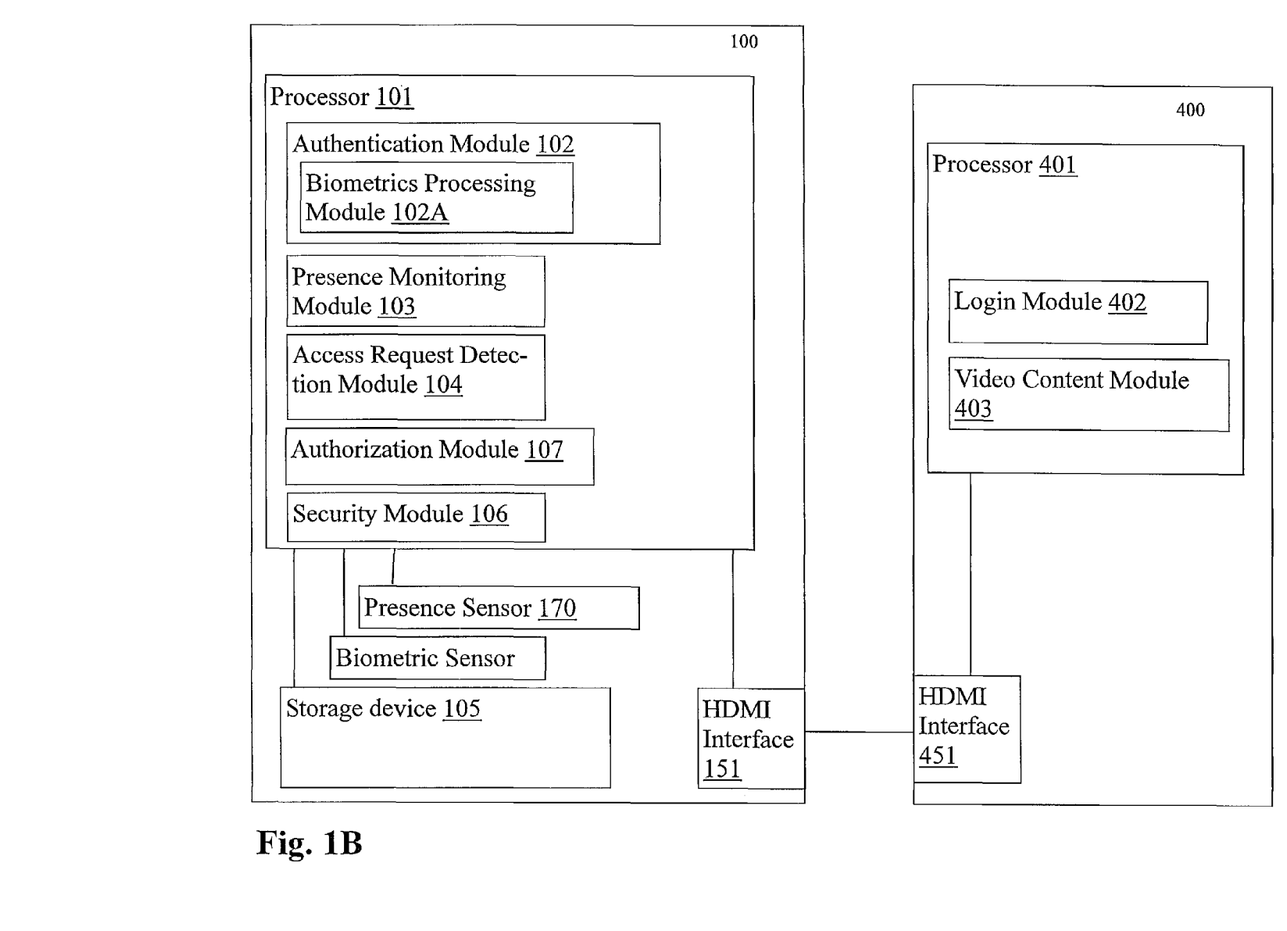
FIG. 1B illustrates example modules of the example electronic display.

FIG. 1B illustrates a processor 101 of electronic display 100 that is configured to execute one or more modules, including an authentication module 102, a biometric processing module 102A, a presence monitoring module 103, an access request detection module 104, and a security module 106. The modules may be stored on storage device 105 of electronic display 100. Processor 101 and storage device 105 may both be housed in housing 110. Display 100 may be in communication with an external computing device, such as desktop computer 400, through a communication interface 151 on display 100. Communication interface 151 may be part of communication interface 150, or may be a separate interface component. In some implementations, interface 151 may include an HDMI, DVI, VGA, or another interface that implements a communication channel, such as the Display Data Channel (DDC) protocol, which allows the display to communicate information to desktop computer 400. Desktop computer 400 may comprise a processor 401 configured to execute a login module 402 and a video content module 403 and may comprise an HDMI interface 451 configured to communicate with the display.

In the embodiment shown in FIG. 1B, video content shown on display 100 may be provided by video content module 403 running on processor 401 of desktop computer 400. The desktop computer may be configured to transmit other content, such as a rendering of a login screen that may be presented by display 100. In some implementations, all content from desktop computer 400, including a login screen, may be displayed only after a user has authenticated his or her identity to the display. In some implementations, the login screen may include a "claimed identity" screen before receiving authentication information, and may receive a claimed identity (e.g. user name) as well as authentication information. In some implementations, the "claimed identity" screen may be used as a login screen, while in some implementations a separate login screen may be presented to log in a user after he or she has been authenticated. In some implementations, authentication information may be used to establish a user's identity without an a prior claimed identity. The display may transmit received information to desktop computer 400. Information may include, for example, a user ID and a password, and may be transmitted to computer 400 by display 100 or by a peripheral input device. If login is successful, desktop computer 400 may transmit video content from HDMI interface 451 to HDMI interface 151 of display 100. If authentication (e.g., biometric authentication) is successful, display 100 may present the received video content to the user. If presence sensor 170 indicates that the user has left the display, display 100 may require authentication again when that user or another user returns.

In some implementations, desktop computer 400 may transmit content to display 100 only if it receives indication from the display that authentication has been performed. In some implementations, display 100 may be configured to verify the display's identity to desktop computer 400. Desktop computer 400 may transmit content to display 100 only if the display's identity remains unchanged or only if the display's identity indicates the display to be a secure display device (e.g., such as a device that performs biometric authentication). If display 100 is swapped with an unsecure display device, desktop computer 400 may detect a change in an identity of the swapped-in display device, and may stop transmitting content. In some implementations, a login module and video content module may both be implemented on processor 101 of display 100, which may act as a standalone device that does not require an external computing device to generate video content.

Biometric processing module 102A running on display 100 may be configured to receive the collected biometric information from the sensors of electronic display 100 and to compare relevant features of the biometric information against features in a biometrics database. In some implementations, the biometrics database may be stored on storage device 105, which may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. In some implementations, the biometrics database may be stored on an external storage device, such as on a server.

Authentication module 102 may be configured to verify that a user attempting to access display 100 is who the user claims to be or to verify that the user identity matches one or more identities of users who have permission to access display 100. Authentication module 102 may be configured to perform the verification through biometric information, through information gathered by a card, security token, or other document reader, or through any other available means of gathering identification information.

Presence monitoring module 103 may be configured to receive a signal from presence sensor 170 and to stop presentation of content (e.g., on screen 115 or on a speaker) after, for example, the presence sensor detects absence from display 100. The module may stop presentation immediately after a user has left the display or after a threshold duration. Presence monitoring module 103 may be configured to place the electronic display into a blanked or screen saver mode, after which the user must re-authenticate his or her identity to access content on the electronic display. In some implementations, presence monitoring module 103 may require a lower degree of authentication to access the display from a blanked or screen saver mode than that required for an initial authentication.

In some implementations, the presence monitoring module may be configured to measure a time during which a user has been absent. Module 103 may be configured to blank screen 115 after the user has been absent for a threshold period. Module 103 may transmit such an indication to login module 402, immediately or following the threshold period, and module 402 may then log out of a user's session. Although FIG. 1B shows login module 402 running on desktop computer 400, in some implementations display 100 may run a login module configured to log in and log out users. In some implementations, a user attempting to access content after he or she has been logged off may have to log in again with login module 402 and may have to authenticate his or her identity with authentication module 102.

Access request determination module 104 may be configured to receive identification information from sensors of electronic display 100, a signal from presence sensor 170, any other user input, or a combination thereof to determine whether the user input is part of a request to access content on the electronic display. Access request determination module 104 may be configured to process user input, such as voice input, alphanumeric input, or a combination thereof, to determine if the input comprises a login command or any other command to access the display. The module may determine that there is an access request based on detecting a user's presence, receiving a login or authentication command, receiving user identification information (e.g., through insertion of a card, or capture of a biometric input), or any combination thereof. Module 104 may be configured to transmit received login information to login module 402.

Access request determination module 104 may be configured to determine a level of access that has been requested. In some implementations, module 104 may receive the level of access from desktop computer 400, which may determine the level of access based on, for example, a user's login ID. The desktop computer may, for example, look up an access level associated with user identification information in an access level database, or any combination thereof. For example, the desktop computer 400 may use a login ID, identification card information, fingerprint information, or any other user identification information (received, e.g., from display 100) to look up an access level associated with one or more users associated with the identification information. The access level database may specify types of identification information (e.g., fingerprint and iris image information) that must be authenticated for a particular access level. A higher access level (e.g., an access level that is more secure, an access level that provides access to more information, or both) may require greater or different (or both) authentication evidence. Authentication module 102 may receive such authentication requirements from access request determination module 104. In some implementations, access level database may be stored on a device external to display 100. In some implementations, access level database may be stored on storage device 105 and access request detection module 104 may be configured to itself look up the access level associated with one or more users attempting to log in.

In some implementations, to protect information communicated between display 100 and an external device, such as desktop computer 400, security module 106 may be configured to encrypt information transmitted to the external device and to decrypt information transmitted from the external device.

In some implementations, security module 106 may be configured to verify the display's identify to the external device 400. In one example, verifying the display's identity may be performed through public key cryptography. Verification information may be signed, encrypted, or both signed and encrypted with a private key associated with the display, for instance, and transmitted to the display where it can be verified and/or decrypted using the display's public key. In some instances, such verification might be required in response to an indication at interface 451 that the video cable has been disconnected or, more generally, that a display (e.g., one that requires authentication) has been disconnected and that later either the same display or a different display is connected to interface 451. In some instances, such verification might be performed repeatedly on a periodic basis. In some instances, when such verification is performed might be based on events, such as during login or before certain resources can be accessed. In some implementations, HDMI interface 151, HMDI interface 451, or a combination thereof may monitor a electrical load at the interface to detect disconnection of or tampering with a video cable that was connected to the interface.

Authorization module 107 may be configured to determine whether even a user who has authenticated his or her identity is authorized to view certain content. For example, a user may be allowed to view only content whose security classification does not exceed the user's maximum security clearance, to view content during only certain hours, or to view content only if other team members or supervisors are present in the room.

Figure 2:
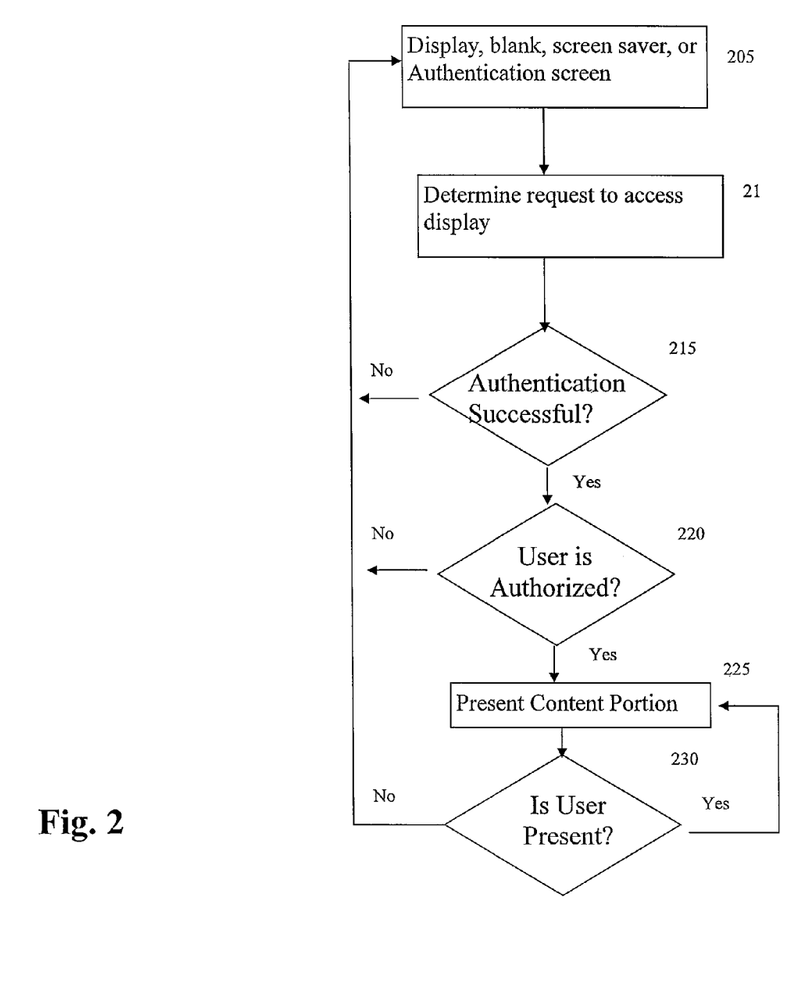
FIG. 2 illustrates a flow diagram of example operations for performing biometric authentication based on a user's absence.

FIG. 2 illustrates a method 200 in which an electronic display may present content on the display only if a user is present and has authenticated his or her identity through biometric authentication. In some implementations, the electronic display may require different degrees of authentication based on whether the user is making an initial authentication or is returning to the display after a temporary absence. In some implementations, method 200 may be implemented in one or more processing devices (e.g., a digital processor, an analog processor, a digital circuit designed to process information, an analog circuit designed to process information, a state machine, and/or other mechanisms for electronically processing information), such as processor 101. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 205, a blank screen, screen saver, or authentication screen may be displayed on an electronic display such as display 100. In one example, a blank screen may be displayed on screen 115, which may have been blanked in response to an indication from presence monitoring module 103 running on processor 101 of display 100. In some implementations, authentication of a user's identity by display 100 may be separate from a login of the user by an external computing device, such as desktop computer 400. For example, the user may have to authenticate his or her identity in order to see a login screen generated by desktop computer 400. In some implementations, display 100 may cooperate with an external computing device to jointly determine login criteria. In one example, the authentication screen at operation 205 may collect login information for desktop computer 400. In one example, biometric information collected by display 100 may be used as a login ID. In some implementations, login functions may be performed entirely on display 100.

At operation 210, display 100 may be determined that there is a request to access content. In some implementations, the display may determine that there is an access request based on an input detected by one or more sensors. For example, the display may determine that there is an access request based on detecting a user's presence by a presence sensor (e.g., detecting a user's face in a field of view of a camera), receiving identification card data from a card reader, detecting a user's finger being in contact with a fingerprint sensor or touch screen of the display, detecting a user's voice by a microphone, detecting an external sensor being connected to a communication interface, detecting any other user input, or any combination thereof.

At operation 215, an authentication of the user's identity may be performed and whether the authentication is successful may be determined. For example, at operation 215, authentication module 102 running on display 100 may receive a user ID and fingerprint information from the user and determine whether the received fingerprint information matches fingerprint information associated with the user ID in a biometrics database. In some implementations, information required for the authentication may depend on a level of access associated with the information request. For example, content that requires a high level of security may require fingerprint and iris information or fingerprint and voice information for the authentication. If the content is received from an external device, the required level of access may be received from the external device as well. In some implementations, information required for the authentication may require whether a user requesting access is returning from a temporary physical absence or whether the user is being authenticated for a first time. Whether a user is new or is returning may be determined, for example, from a user ID or from his or her fingerprint information. If the user is returning after having physically left, the fingerprint information may be sufficient for biometric authentication. If the user is being authenticated for the first time, he or she may have to provide voice information or iris information as well for the authentication. If authentication is not successful, the blank screen, screen saver, or authentication screen may be maintained. In some implementations, if authentication is successful, content may be presented. In some implementations, content may be presented if a user is both authenticated and authorized.

Whether the user is authorized to access content may be determined at operation 220. For example, even though the user has authenticated his or her identity, he or she may not be allowed to view certain content because the content may be viewed only by certain users, may be viewed only during certain hours of the day, or may be viewed only if a supervisor is present. Presence of the supervisor may be detected, for example, by a camera in a housing of the display and by a face recognition program running on the display. In another example, presence of a supervisor might be determined based on whether a nearby computer indicates that the supervisor is logged on.

At operation 225, content may be presented to the user. In some implementations, the content may include a login screen generated by, for example, an external computing device. In some implementations, authentication performed by the display may be trusted by the external computing device, which may allow the user to be automatically logged in, and which may allow operation 225 to present video or audio content sought by the user directly after the authentication.

When content is being presented at operation 225, user presence may be periodically checked at operation 230. For example, user presence may be checked by presence monitoring module 103. If user is determined to be present, the content may continue to be presented to the user. If the user is determined not to be present, presentation of the content may be stopped. Stopping presentation of the content may include blanking a screen or otherwise removing content from the screen, muting a speaker or otherwise removing content from the speaker, or any combination thereof. In some implementations, the presentation may be stopped only if the user has been absent for more than a threshold amount of time.

In some implementations, the user's absence may be communicated to a module for managing the user's session. The module may be executed on, for example, display 100 or desktop computer 400. Based on the user's absence, a session in which the user has logged into may be locked or logged off.

The operations of method 200 presented above are intended to be illustrative. In some embodiments, the illustrated operations may be performed by, for example, authentication module 102, presence monitoring module 103, access request determination module 104, security module 106, authorization module 107, or may be performed by any other modules configured to perform the operations. In some embodiments, method 200 may be accomplished with one or more additional operations not described, and/or without one or more of the operations discussed. For example, in some instances, the determination of presence performed in operation 230 may be performed continuously, allowing operations 210, 215, 220 to be skipped if no user is present to request access and input authentication information. Additionally, the order in which the operations of method 200 are illustrated in FIG. 2 and described above is not intended to be limiting. Similarly, many operations may be performed in parallel.

Figure 3:
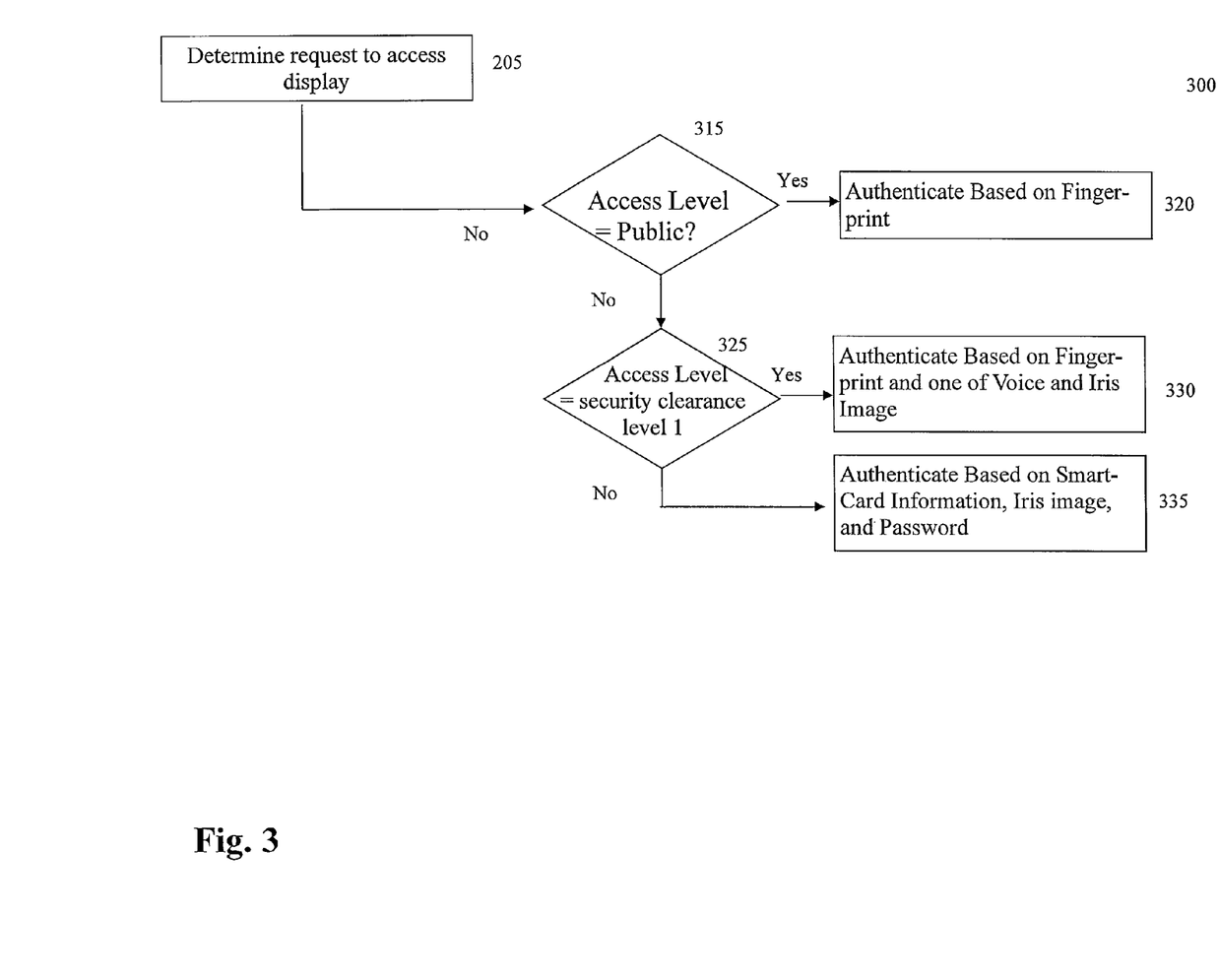
FIG. 3 illustrates a flow diagram of example operations for performing different degrees of authentication based on the determination of access level.

FIG. 3 illustrates a method 300 in which an electronic display may require different degrees of biometric authentication based on a user's access level. A higher level of access may require more biometric or other identification information from the user. For example, after the display determines that there is a request to access the display at operation 210, it may determine at operations 315 and 325 whether the access request seeks access at a public level or at a higher security clearance level. A user logged into a higher security clearance level may be able to access more information and applications than a user logged into a public level. In some implementations, the access request may specify its access level. For example, the display's screen may show an authentication or login interface that allows the user to specify the access level. In some implementations; the access level may be determined based on the received identification information. For example, the display may receive identification card information or a login ID that may be associated with an access level. A database may associate a particular card holder or a particular login ID (e.g., "admin") with a particular access level. In some implementations, an access level may be determined from what content is requested. For example, a particular file may be presented to only users with an access level of security clearance of top secret or higher. The access level may be determined by, for example, display 100 or an external device such as desktop computer 400.

If at operation 315 it is determined that only public-level access is being requested, then an authentication based on the user's fingerprint information may be performed at operation 320. In some implementations, the authentication may verify whether the user requesting access is the user logged into the current session. If, at operation 315, it is determined that non-public access was requested, whether the requested access level is a first security clearance level may be determined at operation 325. If at operation 325, it was determined that the requested access level is a first security clearance level, operation 330 may be performed, where an authentication based on multiple pieces of authentication information, such as the user's fingerprint information and one of the user's voice information and iris image information, may be performed. If at operation 325 it was determined that the request required an unknown security level, or a level greater the security clearance level 1, operation 335 may be performed, where an authentication based on, for example, the user's smart card information, iris image information, and password information may be performed. The operations of method 300 presented above are intended to be illustrative. In some embodiments, the illustrated operations may be performed by, for example, authentication module 102, presence monitoring module 103, and access request determination module 104, security module 106, or may be performed by any other modules configured to perform the operations. In some embodiments, method 300 may be accomplished with one or more additional operations not described, and/or without one or more of the operations discussed. Additionally, the order of the operations, number of security levels, methods of authentication, and types and amount of authentication information of method 300, as illustrated in FIG. 3 and described above, are for example only, and are not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information), such as processor 101. The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

In some implementations, the amount and types of biometric authentication information, other identification information, or combination thereof required to access content may be customized. In one example, a systems administrator (who may himself have to be authenticated to access the display) may be allowed to change the biometric or other identification information required to access a display. The systems administrator may be allowed to change the biometric and other identification information required to access the display at each of a plurality of access levels. In another example, the display may receive a software or firmware update that specifies biometric and other identification information required to authenticate an access request.

Although the invention has been described in detail for the purpose of illustration based on what is considered to be practical embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment, and that the order in which the operations illustrated in FIGS. 2 and 3 are not intended to be limiting.

What is claimed is:

1. An electronic display for controlling access to content, comprising:
   a display screen;
   one or more sensors; and
   one or more physical processors programmed with computer program instructions which, when executed, cause the one or more physical processors to:
     obtain information from the one or more sensors;
     determine whether a first user is within proximity of the electronic display based on the information from the one or more sensors;
     determine whether a user other than the first user is within proximity of the electronic display based on the information from the one or more sensors;
     determine whether a current time is within a predefined access time period associated with the first user;

limit presentation of the content on the display screen in response to a determination that the first user is not within proximity of the electronic display;

limit presentation of the content on the display screen in response to a determination that a user other than the first user is within proximity of the electronic display; and limit presentation of the content on the display screen in response to a determination that the current time is not within the predefined access time period.

2. The electronic display of claim 1, wherein the one or more physical processors are further caused to:

present, on the display screen, the content in response to a determination that the first user is within proximity of the electronic display, that a user other than the first user is not within proximity of the electronic display, and that the current time is within the predefined access time period.

3. The electronic display of claim 2, wherein the one or more physical processors are further caused to:

receive at least one of card information, token information, password information, answer information associated with a security question, personal identification number information, or authentication document image information, wherein presenting the content on the display screen comprises presenting the content on the display screen further in response to the receipt of at least one of card information, token information, password information, answer information associated with a security question, personal identification number information, or authentication document image information.

4. The electronic display of claim 1, wherein presentation of the content is limited by transmitting, to a device external to the electronic display, an indication to perform at least one of locking a session of the first user or logging the first user out of the session, wherein, in is locked or the first user is logged out of the session.

5. The electronic display of claim 4, wherein transmitting the indication to the external device comprises transmitting the indication to the external device via a video interface of the electronic display, and wherein the video interface comprises at least one of a VGA interface, a DVI interface, or a HDMI interface.

6. The electronic display of claim 1, wherein presentation of the content on the display screen is limited by removing the content from the display screen.

7. The electronic display of claim 1, wherein the one or more physical processors are further caused to:

present, on the display screen, the content in response to a determination that only the first user is within proximity of the electronic display and that the current time is within the predefined access time period; and limit presentation of the content on the display screen in response to a determination that more than one user is within proximity of the electronic display.

8. The electronic display of claim 1, wherein determining whether the first user is within proximity of the electronic display comprises determining, based on the information from the one or more sensors, whether a physical presence of a user was detected by the one or more sensors and, if detected, whether the detected user is the first user, and wherein limiting presentation of the content on the display screen in response to the determination that the first user is not within proximity of the electronic display comprises limiting presentation of the content on the display screen in response to at least one of: (i) a determination that a physical presence of a user was not detected by the one or more sensors; or (ii) a determination that a physical presence of a user was detected by the one or more sensors and that the detected user is not the first user.

9. A method of controlling access to content via an electronic display, the method being implemented on the electronic display that includes one or more physical processors executing computer program instructions which, when executed, perform the method, the method comprising:

obtaining, by the electronic display, information from one or more sensors of the electronic display;

determining, by the electronic display, whether a first user is within proximity of the electronic display based on the information from the one or more sensors;

determining, by the electronic display, whether a user other than the first user is within proximity of the electronic display based on the information from the one or more sensors;

determining, by the electronic display, whether a current time is within a predefined access time period associated with the first user;

limiting, by the electronic display, presentation of the content on the display screen in response to a determination that the first user is not within proximity of the electronic display;

limiting, by the electronic display, presentation of the content on the display screen in response to a determination that a user other than the first user is within proximity of the electronic display; and limiting, by the electronic display, presentation of the content on the display screen in response to a determination that the current time is not within the predefined access time period.

10. The method of claim 9, further comprising:

presenting, by the electronic display, the content on the display screen in response to a determination that the first user is within proximity of the electronic display, that a user other than the first user is not within proximity of the electronic display, and that that current time is within the predefined access time period.

11. The method of claim 10, further comprising:

receiving, at the electronic display, at least one of card information, token information, password information, answer information associated with a security question, personal identification number information, or authentication document image information, wherein presenting the content on the display screen comprises presenting the content on the display screen further in response to the receipt of at least one of card information, token information, password information, answer information associated with a security question, personal identification number information, or authentication document image information.

12. The method of claim 9, wherein presentation of the content is limited by transmitting, to a device external to the electronic display, an indication to perform at least one of locking a session of the first user or logging the first user out of the session, and wherein, in response to the transmission of the indication, at least one of the session is locked or the first user is logged out of the session.

13. The method of claim 9, wherein presentation of the content on the display screen is limited by removing the content from the display screen.

14. The method of claim 9, wherein the information from the one or more sensors comprises biometric information, and wherein the biometric information comprises at least one of voice information, facial image information, fingerprint information, hand geometry information, iris image information, or retina image information.

15. The method of claim 9, further comprising:
presenting, by the electronic display, on the display screen, the content in response to a determination that only the first user is within proximity of the electronic display and that the current time is within the predefined access time period; and
limiting, by the electronic display, presentation of the content on the display screen in response to a determination that more than one user is within proximity of the electronic display.

16. An electronic display for controlling access to content, comprising:
a display screen;
one or more sensors; and
one or more physical processors programmed with computer program instructions which, when executed, cause the one or more physical processors to:
obtain information from the one or more sensors;
determine whether a first user and a second user are within proximity of the electronic display based on the information from the one or more sensors;
present, on the display screen, the content in response to a determination that at least both the first user and the second user are within proximity of the electronic display; and
limit presentation of the content on the display screen in response to a determination that at least one of the first user or the second user are not within proximity of the electronic display.

17. The electronic display of claim 16, wherein limiting presentation of the content on the display screen comprises limiting presentation of the content on the display screen in response to:
a determination that the first user is within proximity of the electronic display and that the second user is not within proximity of the electronic display; or
a determination that the first user is not within proximity of the electronic display and that the second user is within proximity of the electronic display.

18. An electronic display for controlling access to content, comprising:
a display screen;
one or more sensors; and
one or more physical processors programmed with computer program instructions which, when executed, cause the one or more physical processors to:
obtain information from the one or more sensors;
determine whether only one user or more than one user is within proximity of the electronic display based on the information from the one or more sensors;
present, on the display screen, the content in response to a determination that only one user is within proximity of the electronic display; and
limit presentation of the content on the display screen in response to a determination that more than one user is within proximity of the electronic display.

19. The electronic display of claim 18, wherein the one or more physical processors are further caused to:
determine whether an authorized user is within proximity of the electronic display based on the information from the one or more sensors; and
present, on the display screen, the content in response to a determination that an authorized user is within proximity of the electronic display and that only one user is within proximity of the electronic display.

20. The electronic display of claim 19, wherein the content is presented on the display screen at a first time in response to the determination that an authorized user is within proximity of the electronic display and that only one user is within proximity of the electronic display, and wherein presentation of the content on the display screen is limited at a second time after the first time in response to the determination that more than one user is within proximity of the electronic display.

* * * * *